United States Patent
Jeong et al.

(10) Patent No.: US 10,863,131 B2
(45) Date of Patent: Dec. 8, 2020

(54) IMAGE SENSOR INCLUDING PARALLEL OUTPUT OF PIXEL SIGNALS FROM A PIXEL UNIT AND IMAGE PROCESSING SYSTEM INCLUDING THE SAME

(71) Applicant: Samsung Electronics Co., Ltd., Suwon-si (KR)

(72) Inventors: Il Yun Jeong, Yongin-si (KR); Chae Sung Kim, Seoul (KR); Jung Chan Kyoung, Seoul (KR); Yun Jung Kim, Yongin-si (KR); Jong-Seok Seo, Seoul (KR); Jae-Sung Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 531 days.

(21) Appl. No.: 15/160,369

(22) Filed: May 20, 2016

(65) Prior Publication Data
US 2016/0344953 A1    Nov. 24, 2016

(30) Foreign Application Priority Data

May 20, 2015   (KR) .................. 10-2015-0070640
May 20, 2016   (KR) .................. 10-2016-0062216

(51) Int. Cl.
*H04N 5/378*    (2011.01)
*H04N 5/369*    (2011.01)
*H04N 5/335*    (2011.01)

(52) U.S. Cl.
CPC ............ *H04N 5/378* (2013.01); *H04N 5/335* (2013.01); *H04N 5/379* (2018.08)

(58) Field of Classification Search
CPC ...... H04N 5/3532; H04N 5/378; H04N 5/379; H01L 27/14634
See application file for complete search history.

(56) References Cited

U.S. PATENT DOCUMENTS

| | | |
|---|---|---|
| 7,129,979 B1 | 10/2006 | Lee |
| 7,804,536 B2 | 9/2010 | Blerkom |
| 7,884,871 B2 | 2/2011 | Smith et al. |
| 8,077,240 B2 | 12/2011 | Ellis-Monaghan et al. |
| 8,153,947 B2 | 4/2012 | Barbier et al. |
| 8,358,359 B2 | 1/2013 | Baker et al. |
| 8,575,531 B2 | 11/2013 | Hynecek et al. |
| 8,749,678 B2 | 6/2014 | Yamashita |
| 8,797,439 B1 | 8/2014 | Coley et al. |

(Continued)

*Primary Examiner* — Nelson D. Hernández Hernández
(74) *Attorney, Agent, or Firm* — Myers Bigel, P.A

(57) ABSTRACT

An image sensor includes a pixel array including a plurality of pixels configured to output pixel signals corresponding to a plurality of row lines; a row driver configured to output a plurality of control signals for controlling operations of the plurality of pixels; a plurality of analog-to-digital converters configured to perform analog-to-digital conversion on the pixel signals output from the plurality of pixels via a plurality of column lines so as to generate digital pixel signals, and to output the digital pixel signals; and a timing generator configured to generate a line control signal, the pixel array being configured to output the pixel signals corresponding to the plurality of row lines responsive to the line control signal. The pixel signals are output in a predetermined pixel unit in parallel from at least one row line among the plurality of row lines responsive to the row driver receiving the line control signal.

20 Claims, 12 Drawing Sheets

(56) References Cited

U.S. PATENT DOCUMENTS

| | | | |
|---|---|---|---|
| 8,830,367 B1* | 9/2014 | Mobbs | H04N 5/2329 348/296 |
| 2006/0023109 A1* | 2/2006 | Mabuchi | H01L 24/17 348/340 |
| 2008/0309810 A1* | 12/2008 | Smith | H04N 5/235 348/319 |
| 2009/0201400 A1 | 8/2009 | Zhang et al. | |
| 2009/0219266 A1 | 9/2009 | Lim et al. | |
| 2010/0061707 A1* | 3/2010 | Kosakai | H04N 5/232 386/241 |
| 2010/0276572 A1* | 11/2010 | Iwabuchi | H01L 23/481 250/208.1 |
| 2011/0304758 A1 | 12/2011 | Eldesouki et al. | |
| 2012/0273854 A1 | 11/2012 | Velichko et al. | |
| 2013/0044230 A1 | 2/2013 | Zhou et al. | |
| 2013/0258151 A1 | 10/2013 | Ayers et al. | |
| 2013/0334403 A1 | 12/2013 | Kozlowski | |
| 2014/0071299 A1 | 3/2014 | Grundmann et al. | |
| 2014/0078277 A1 | 3/2014 | Dai et al. | |
| 2015/0163403 A1* | 6/2015 | Wakabayashi | H04N 5/3745 348/308 |
| 2016/0065821 A1* | 3/2016 | Barna | H04N 5/2353 348/368 |

* cited by examiner

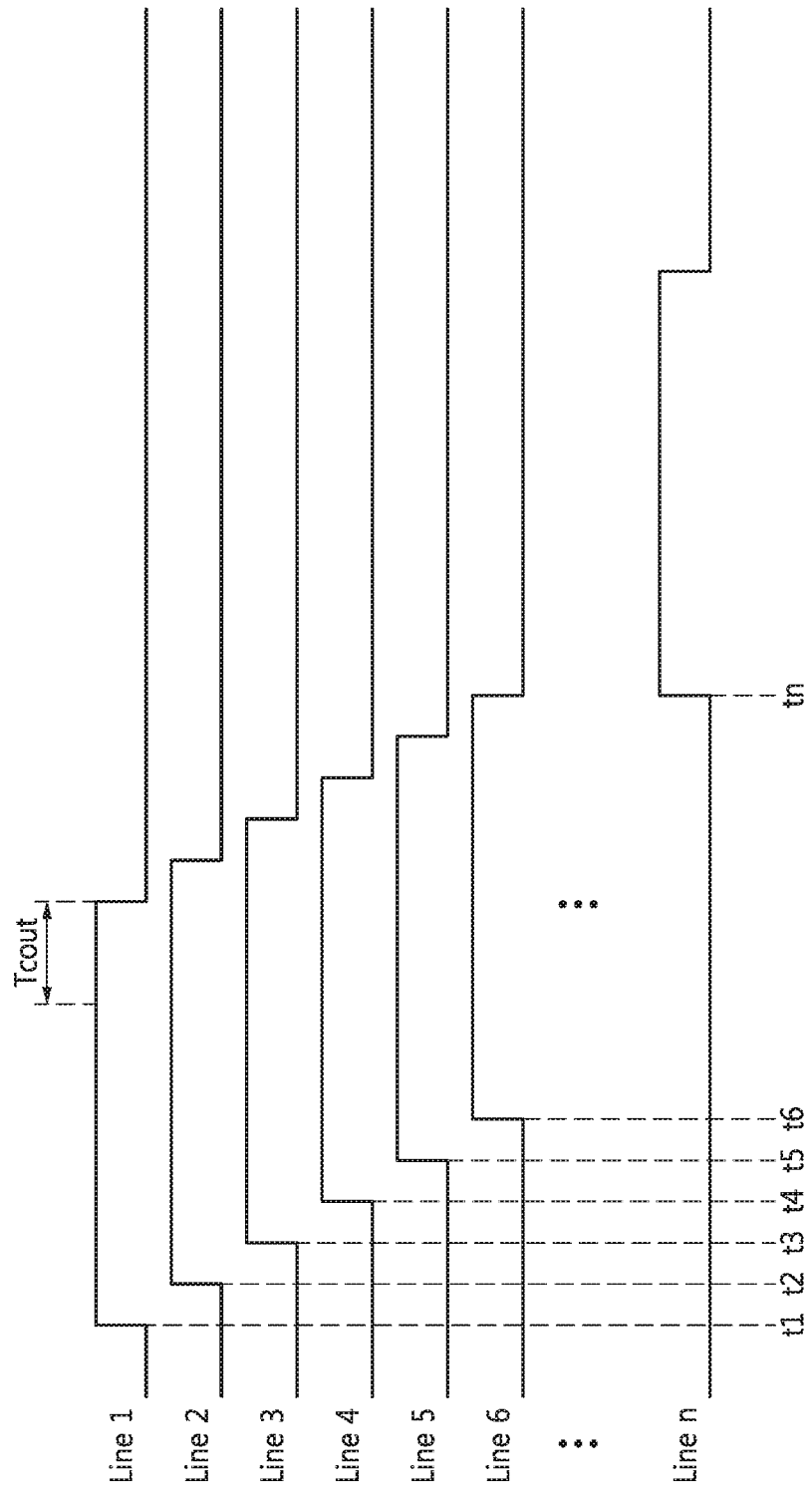

IMAGE SENSOR INCLUDING PARALLEL OUTPUT OF PIXEL SIGNALS FROM A PIXEL UNIT AND IMAGE PROCESSING SYSTEM INCLUDING THE SAME

CROSS-REFERENCE TO RELATED APPLICATIONS

This application claims the priority under 35 U.S.C. § 119 to Korean Patent Application No. 10-2015-0070640, filed on May 20, 2015 and Korean Patent Application No. 10-2016-0062216, filed on May 20, 2016, the entire contents of which are incorporated herein by reference in their entirety.

FIELD

One or more example embodiments of the inventive concept relate to an image sensor and an image processing system including the same, and more particularly, to an image sensor capable of increasing the performance thereof when the image sensor is operated according to a rolling shutter method, and an image processing system including the same.

BACKGROUND

An image sensor is a device that converts an optical image into an electrical signal. Image sensors may be used in digital cameras or other image processing devices. Image sensors may include a plurality of pixels.

In general, a mechanical shutter method or an electrical shutter method is used to control an exposure time that determines the amount of photocharges that are the basis for the electrical signal.

First, the mechanical shutter method is configured to physically block light to be incident on pixels by using a mechanical device.

Second, the electrical shutter method is mainly used in complementary metal-oxide semiconductor (CMOS) image sensors (CISs), and is configured to electrically control an integration time during which photocharges are generated and accumulated.

Examples of the electrical shutter method include a rolling shutter method and a global shutter method. In the rolling shutter method, the integration time may be controlled so as to vary between different rows of a pixel array. In the global shutter method, the integration time is controlled so as to be uniform for all of the rows of the pixel array.

In the rolling shutter method, image distortion may occur due to different integration times for the respective rows of the pixel array.

SUMMARY

The inventive concept provides an image sensor capable of reducing image distortion occurring when a rolling shutter method is used, and an image processing system including the same.

According to some aspects of the inventive concept, an image sensor includes a pixel array including a plurality of pixels configured to output pixel signals corresponding to a plurality of row lines; a row driver configured to output a plurality of control signals for controlling operations of the plurality of pixels; a plurality of analog-to-digital converters configured to perform analog-to-digital conversion on the pixel signals output from the plurality of pixels via a plurality of column lines so as to generate digital pixel signals, and to output the digital pixel signals; and a timing generator configured to generate a line control signal, the pixel array being configured to output the pixel signals corresponding to the plurality of row lines responsive to the line control signal. The pixels signals are output in a predetermined pixel unit in parallel from at least one row line among the plurality of row lines responsive to the row driver receiving the line control signal.

In an example embodiment, each of the plurality of analog-to-digital converters may include a correlated double sampling (CDS) block configured to perform CDS on the pixel signals output from the plurality of pixels via the plurality of column lines; and a databus (DBS) block configured to respectively convert the pixel signals on which CDS is performed into the digital pixel signals, and to output the digital pixel signals.

In an example embodiment, the image sensor may further include a frame controller configured to store, in a frame memory, the digital pixel signals output in parallel from the DBS block, and sequentially output the stored digital pixel signals; and a channel converter configured to convert a number of channels corresponding to the plurality of column lines into channels corresponding to input ports of the frame controller. The channel converter may be configured to convert N channels corresponding to the plurality of column lines into L channels corresponding to the input ports of the frame controller, wherein N denotes an integer that is greater than or equal to 4 and L denotes an integer that is less than N. The frame memory may include a static random access memory (SRAM), and the frame controller may be configured to manage a storage region of the frame memory.

In an example embodiment, the frame controller may be configured to receive the digital pixel signals output via the L channels, to store the digital pixel signals in the frame memory, and to output the stored digital pixel signals via M channels, wherein M denotes an integer that is less than or equal to L.

In an example embodiment, the timing generator may be configured to control the plurality of row lines to output the pixel signals from the pixel array during a first time interval, and wherein the frame controller is configured to output the digital pixel signals from the frame memory during a second time interval. The first time interval may be shorter than the second time interval.

In an example embodiment, the frame controller may include a compressing device configured to compress the digital pixel signals output from the DBS block to generate compressed digital pixel signals and to output the compressed digital pixel signals to the frame memory; and an uncompressing device configured to uncompress the compressed digital pixel signals stored in the frame memory to generate uncompressed digital pixel signals and to output the uncompressed digital pixel signals.

In an example embodiment, the image sensor may further include an image correction block configured to correct image data corresponding to the digital pixel signals output from the frame controller to generate corrected image data, and to output the corrected image data. The plurality of analog-to-digital converters may include N analog-to-digital converters, and the image correction block may include M image correction circuits.

In an example embodiment, the image sensor may further include an encoder configured to encode the digital pixel signals output from the DBS block to generate encoded data and to output the encoded data to the frame controller; and a decoder configured to decode the encoded data received from the frame controller to generate decoded data, and to output the decoded data.

In an example embodiment, the image sensor may further include a first chip including the frame memory, and a second chip stacked on the first chip, the second chip including the pixel array and the plurality of analog-to-digital converters.

According to some aspects of the inventive concept, an image processing system includes an image sensor; and a digital signal processor coupled to the image sensor where the image sensor is responsive to control by the digital signal processor. The image sensor includes a pixel array including a plurality of pixels configured to output pixel signals corresponding to a plurality of row lines; a row driver configured to output a plurality of control signals for controlling operations of the plurality of pixels; a plurality of analog-to-digital converters configured to perform analog-to-digital conversion on the pixel signals output from the plurality of pixels via a plurality of column lines so as to generate digital pixel signals, and to output the digital pixel signals; and a timing generator configured to generate a line control signal, the pixel array being configured to output the pixel signals corresponding to the plurality of row lines responsive to the line control signal. The pixel signals are output in a predetermined pixel unit in parallel from at least one row line from among the plurality of row lines responsive to the row driver receiving the line control signal.

In an example embodiment, the each of the plurality of analog-to-digital converters may include a correlated double sampling (CDS) block configured to perform CDS on the pixel signals output from the plurality of pixels via the plurality of column lines; and a databus (DBS) block configured to convert the pixel signals on which CDS is performed into digital pixel signals, and to output the digital pixel signals. The image sensor may further include a channel converter configured to convert N channels corresponding to the plurality of column lines into L channels, wherein N denotes an integer that is greater than or equal to 4 and L denotes an integer that is less than or equal to N.

In an example embodiment, the image sensor may further include a frame controller configured to sequentially store, in a frame memory, the digital pixel signals output in parallel from the DBS block via the L channels, and sequentially output the digital pixel signals stored in the frame memory via M channels, wherein M is an integer that is less than L.

In an example embodiment, the timing generator may be configured to control the plurality of row lines to output the pixel signals from the pixel array during a first time interval, and the frame controller may be configured to output the digital pixel signals from the frame memory during a second time interval. The first time interval may be shorter than the second time interval.

In an example embodiment, the frame controller may include a compressing device configured to compress the digital pixel signals output from the DBS block to generate compressed digital pixel signals and to output the compressed digital pixel signals to the frame memory; and an uncompressing device configured to uncompress and output the compressed digital pixel signals stored in the frame memory to generate uncompressed digital pixel signals and to output the uncompressed digital pixels signals.

In an example embodiment, the image sensor may further include a first chip including the frame memory, and a second chip stacked on the first chip, the second chip including the pixel array and the plurality of analog-to-digital converters.

According to some aspects of the inventive concept, an image sensor comprises a pixel array configured to generate a plurality of pixel signals on a plurality of column lines, respectively; a plurality of analog-to-digital signal converter circuits configured to generate a plurality of digital pixel signals responsive to the plurality of pixel signals received on the plurality of column lines, respectively; a channel converter that is configured to multiplex the plurality of digital pixel signals onto a plurality of frame controller input channels; and a frame controller that is configured to store the plurality of digital pixels signals received on the plurality of frame controller input channels and to output the plurality of digital pixel signals onto a plurality of frame controller output channels. The plurality of pixel signals are generated on the plurality of column lines, respectively during a first time interval and the plurality of digital pixel signals are output onto the plurality of frame controller output channels during a second time interval, the first time interval being shorter than the second time interval.

In an example embodiment, a number of the plurality of column lines is N, a number of the plurality of frame controller input channels is L, and a number of the plurality of frame controller output channels is M, wherein N is greater than L and L is greater than or equal to M.

In an example embodiment, each of the plurality of analog-to-digital signal converter circuits comprises a correlated double sampling (CDS) circuit and a databus circuit, the CDS circuit being configured to perform correlated double sampling on a respective one of the plurality of pixel signals to generate a CDS output signal and the databus circuit being configured to generate a respective one of the digital pixel signals responsive to the CDS output signal.

In an example embodiment, the image sensor further comprises an encoder that is configured to encode the plurality of digital pixel signals that are multiplexed onto the plurality of frame controller input channels; and a decoder that is configured to decode the plurality of digital pixel signals that are output onto the plurality of frame controller output channels.

In an example embodiment, the image sensor further comprises a plurality of image correction circuits that are configured to generate a plurality of image corrected signals responsive to the plurality of digital pixel signals output onto the plurality of frame controller output channels, respectively.

It is noted that aspects of the inventive concepts described with respect to one embodiment, may be incorporated in a different embodiment although not specifically described relative thereto. That is, all embodiments and/or features of any embodiment can be combined in any way and/or combination. These and other aspects of the inventive concepts are explained in detail in the specification set forth below.

BRIEF DESCRIPTION OF THE DRAWINGS

Example embodiments of the inventive concept will be more clearly understood from the following detailed description taken in conjunction with the accompanying drawings in which:

FIG. 4 is a timing diagram illustrating operations of an image sensor according to a comparative example of the inventive concept;

DETAILED DESCRIPTION OF THE EMBODIMENTS

Figure 1:
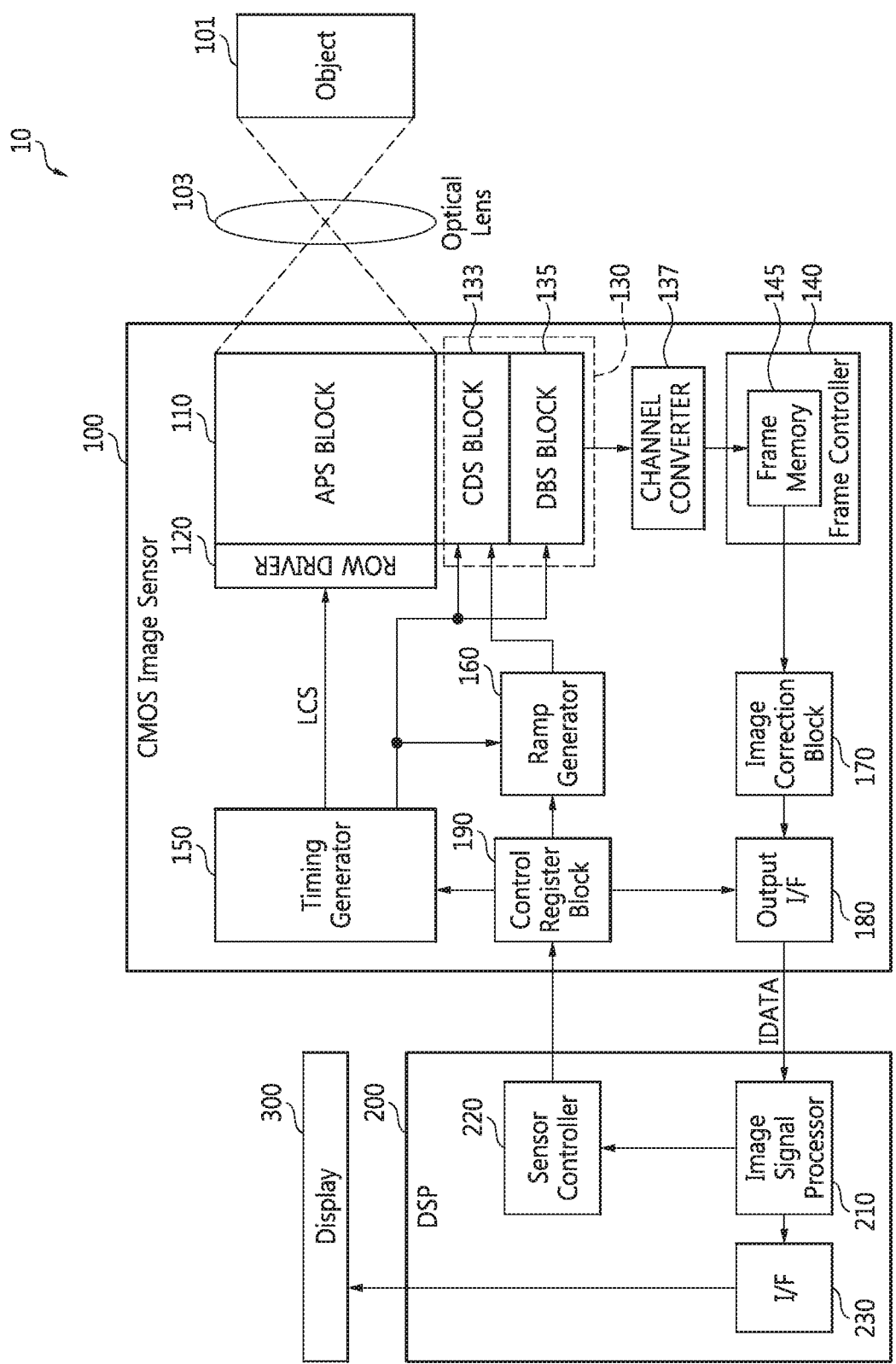
FIG. 1 is a block diagram of an image processing system according to some embodiments of the inventive concept.

The inventive concept now will be described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout the description.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a diagram of an image processing system 10 according to some embodiments of the inventive concept.

Referring to FIG. 1, the image processing system 10 may be a portable electronic device, e.g., a digital camera, a mobile phone, a smart phone, a tablet personal computer (PC), a personal digital assistant (PDA), an enterprise digital assistant (EDA), a digital still camera, a digital video camera, a portable multimedia player (PMP), a mobile internet device (MID), or a wearable computer. Otherwise, the image processing system 10 may be a front camera, a rear camera, or a black box camera of a car.

The image processing system 10 includes an optical lens 103, a complementary metal-oxide semiconductor (CMOS) image sensor 100, a digital signal processor (DSP) 200, and a display 300. The CMOS image sensor 100 and the DSP 200 may be embodied as chips.

The CMOS image sensor 100 may generate image data IDATA of an object 101, which is input (or captured) through the optical lens 103.

The CMOS image sensor 100 may include an active pixel (or an active pixel sensor (APS)) block 110, a row driver 120, an analog-to-digital converter (ADC) block 130, a channel converter 137, a frame controller 140, a frame memory 145, a timing generator 150, a ramp signal generator 160, an image correction block 170, an output interface 180, and a control register block 190.

The active pixel block 110 includes a plurality of pixels for generating pixel signals corresponding to a plurality of row lines. The active pixel block 110 may be referred to as a pixel array. Each of the plurality of pixels may accumulate photocharges generated from incident light and generate a pixel signal corresponding to the accumulated photocharges.

The plurality of pixels may be arranged in the form of a matrix. The plurality of pixels may each include a photoelectric conversion element, and a plurality of transistors for processing photocharges output from the photoelectric conversion element. Each of the plurality of pixels may output a pixel signal corresponding to a column line. For example, the photoelectric conversion element may be a photo diode, a photo transistor, a photogate, or a pinned photo diode.

The row driver 120 may transmit a plurality of control signals for respectively controlling the operations of the plurality of pixels to the active pixel block 110, based on a line control signal LCS received from the timing generator 150.

The ADC block 130 may include a correlated double sampling (CDS) block 133 and a databus (DBS) block 135.

The CDS block 133 performs CDS on pixel signals respectively output from a plurality of column lines included in the active pixel block 110. The DBS block 135 converts, into digital pixel signals, the pixel signals on which CDS is performed and which are output from the CDS block 133, and outputs the digital pixel signals.

The channel converter 137 may convert a number of channels corresponding to the plurality of column lines. The digital pixel signals output from the DBS block 135 may be output to the frame controller 140 via the converted channels.

The frame controller 140 may include the frame memory 145 and manage a storage region of the frame memory 145. The frame controller 140 may control data to be input to the frame memory 145 or to be output from the frame memory 145.

For example, the frame controller 140 may control the frame memory 145 such that input data is not written to only a specific region of the frame memory 145

In this case, the frame memory 145 may be embodied as a volatile memory, such as a static random access memory (SRAM), but is not limited thereto. The frame memory 145 may be a volatile memory or a nonvolatile memory. The volatile memory may be a dynamic random access memory (DRAM), a thyristor RAM (T-RAM), a zero capacitor RAM (Z-RAM), or a twin transistor RAM (TTRAM). The nonvolatile memory may be a flash memory, a magnetic RAM (MRAM), a phase-change RAM (PRAM), or a resistive RAM (RRAM).

The frame controller 140 may sequentially store the digital pixel signals output from the DBS block 135 in the frame memory 145, and sequentially output the stored digital pixel signals.

Operations of the frame controller 140 will be described in more detail with reference to FIGS. 3A and 5 below.

The timing generator 150 controls the operations of the row driver 120, the CDS block 133, the DBS block 135, and the ramp signal generator 160, under control of the control register block 190. The control register block 190 controls the operations of the timing generator 150, the ramp signal generator 160, and the output interface 180, under control of the DSP 200.

The timing generator 150 may generate the line control signal LCS for controlling the output of the pixel signals corresponding to the plurality of row lines.

In one example embodiment, the timing generator 150 may output the line control signal LCS to the row driver 120 such that pixel signals according to a predetermined pixel unit are output in parallel from one or more row lines among the plurality of row lines.

The image correction block 170 may perform color correction, image-quality correction, size adjustment, etc. on image data corresponding to the digital pixel signals output from the frame controller 140, and output the corrected image data.

The output interface 180 transmits image data IDATA output from the image correction block 170 to the DSP 200.

The DSP 200 includes an image signal processor 210, a sensor controller 220, and an interface 230.

The image signal processor 210 controls the sensor controller 220 for controlling the control register block 190, and the interface 230. In some example embodiments, the image sensor 100 and the DSP 200 may be each embodied as a chip, and may be formed together as a one package, e.g., a multi-chip package. In some example embodiments, the image sensor 100 and image signal processor 210 may be each embodied as a chip, and may be formed together as a one package, e.g., a multi-chip package. In some example embodiments, the image sensor 100 and the image signal processor 210 may be embodied as one chip.

The image signal processor 210 processes (or handles) the image data IDATA transmitted from the output interface 180 into image data that may be viewed by a user, and transmits the processed (or handled) image data to the interface 230.

The sensor controller 220 generates various control signals for controlling the control register block 190 under control of the image signal processor 210.

The interface 230 transmits the image data processed by the image signal processor 210 to the display 300.

The display 300 displays the processed image data output from the interface 230. For example, the display 300 may be a thin film transistor-liquid crystal display (TFT-LCD), a light-emitting diode (LED) display, an organic LED (OLED) display, or an active-matrix OLED (AMOLED) display.

Figure 2A:
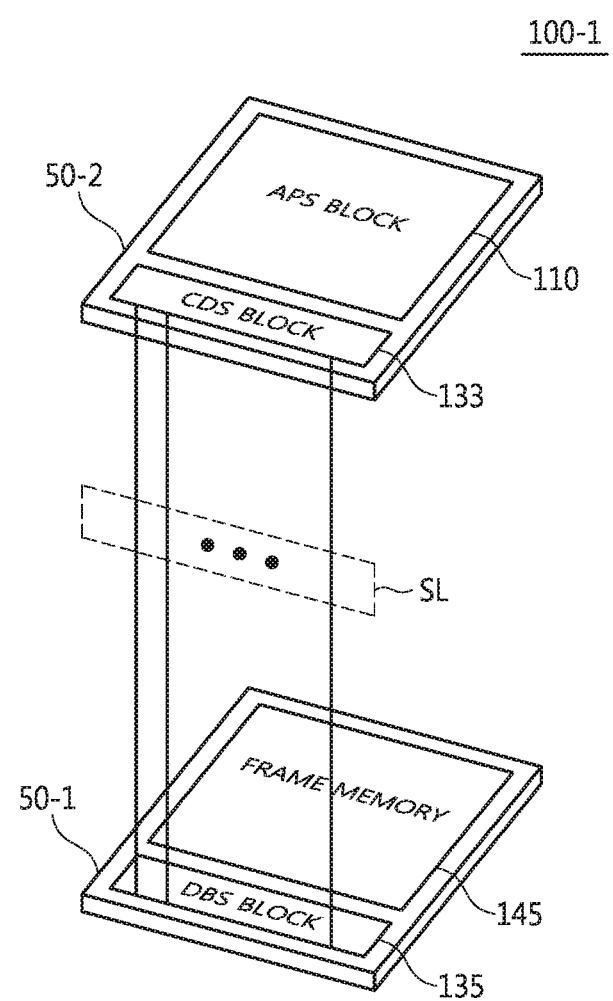
FIG. 2A is a conceptual diagram of an image sensor of FIG. 1 having a stack structure according to some embodiments of the inventive concept.
Figure 2B:
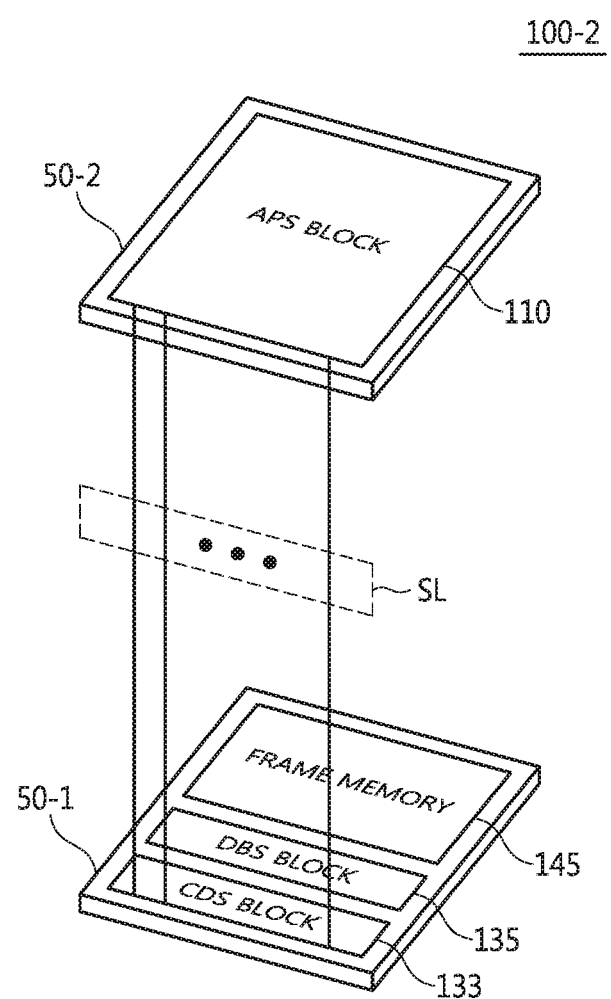
FIG. 2B is a conceptual diagram of an image sensor of FIG. 1 having a stack structure according to some embodiments of the inventive concept.
Figure 2C:
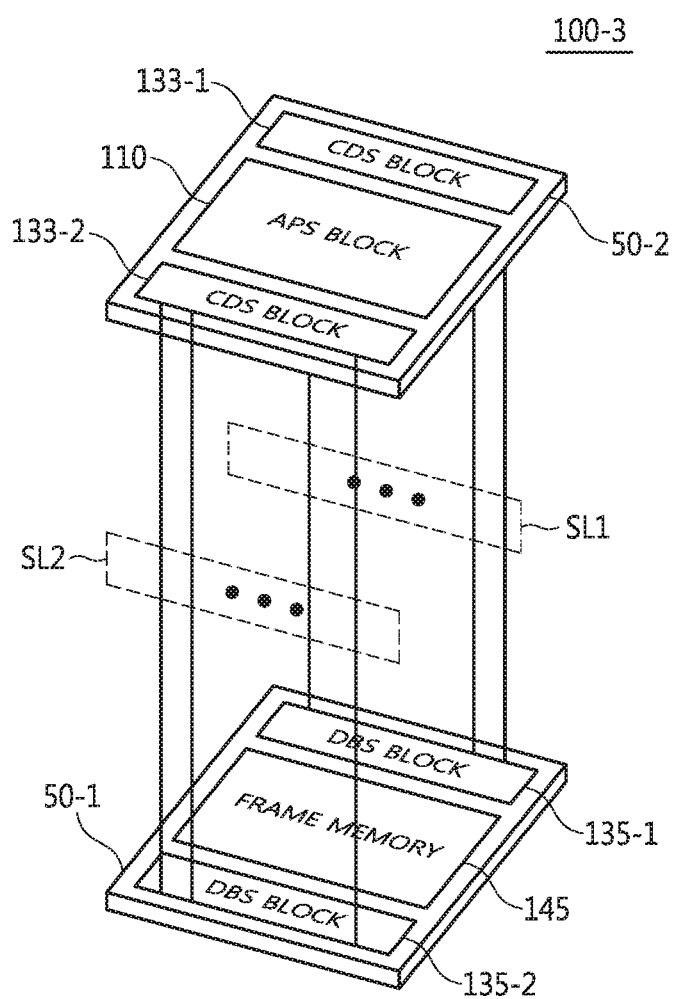
FIG. 2C is a conceptual diagram of an image sensor of FIG. 1 having a stack structure according to some embodiments of the inventive concept.
Figure 2D:
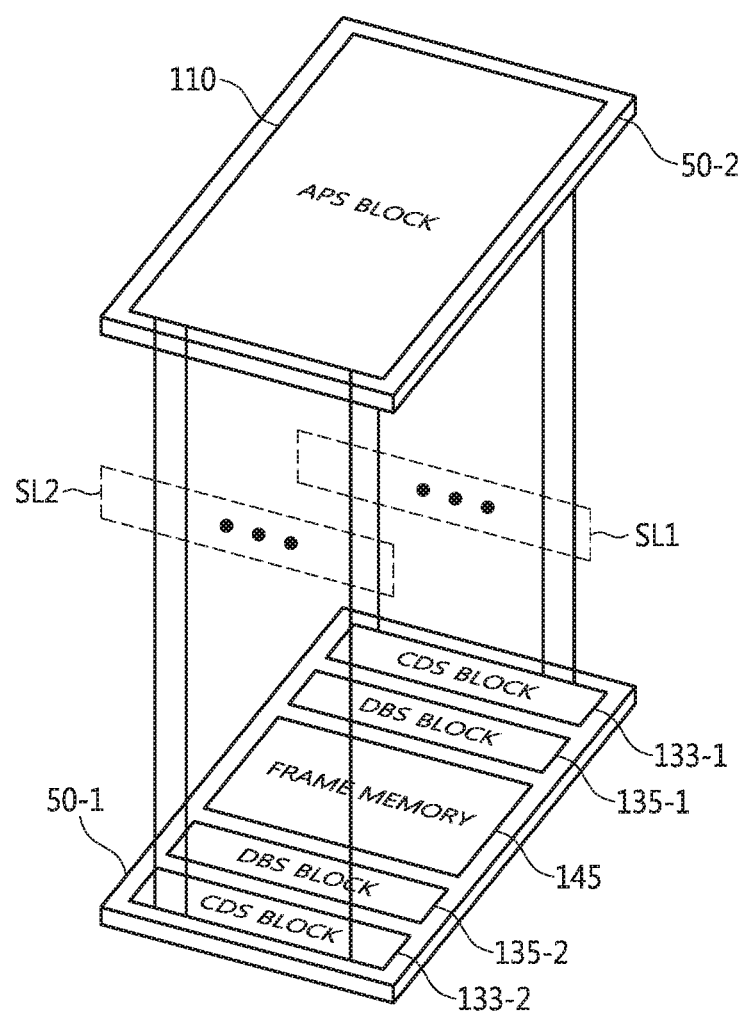
FIG. 2D is a conceptual diagram of an image sensor of FIG. 1 having a stack structure according to some embodiments of the inventive concept.

FIG. 2A is a conceptual diagram of an image sensor 100-1 of FIG. 1 having a stack structure according to some embodiments of the inventive concept. FIG. 2B is a conceptual diagram of an image sensor 100-2 of FIG. 1 having a stack structure according to some embodiments of the inventive concept. FIG. 2C is a conceptual diagram of an image sensor 100-3 of FIG. 1 having a stack structure according to some embodiments of the inventive concept. FIG. 2D is a conceptual diagram of an image sensor 100-4 of FIG. 1 having a stack structure according to some embodiments of the inventive concept.

Referring to FIG. 1 and FIG. 2A, the image sensor 100-1 is one embodiment of the image sensor 100 of FIG. 1.

The image sensor 100-1 may include a first chip 50-1, a second chip 50-2 stacked on the first chip 50-1, and a plurality of signal transmission lines SL configured to transmit pixel signals between the first chip 50-1 and the second chip 50-2.

A DBS block 135 and a frame memory 145 may be included (or formed) in the first chip 50-1. The components 150, 160, 170, 180, and 190 may be also included (or formed) in the first chip 50-1.

An active pixel block 110 and a CDS block 133 may be included (or formed) in the second chip 50-2. A row driver 120 may be also included (or formed) in the second chip 50-2.

Signals output from the CDS block 133 may be transmitted to the DBS block 135 via the plurality of signal transmission lines SL.

Referring to FIGS. 1 and 2B, the image sensor 100-2 is some embodiment of the image sensor 100 of FIG. 1.

The image sensor 100-2 may include a first chip 50-1, a second chip 50-2 stacked on the first chip 50-1, and a plurality of signal transmission lines SL configured to transmit pixel signals between the first chip 50-1 and the second chip 50-2.

According to some example embodiment, only an active pixel block 110 may be included in the second chip 50-2, and a CDS block 133, a DBS block 135, and a frame memory 145 may be included in the first chip 50-1. Signals output from the active pixel block 110 may be transmitted to the CDS block 133 via the plurality of signal transmission lines SL.

Referring to FIGS. 1 and 2C, the image sensor 100-3 is some embodiment of the image sensor 100 of FIG. 1.

The image sensor 100-3 may include a first chip 50-1, a second chip 50-2 stacked on the first chip 50-1, and a plurality of first signal transmission lines SL1 and a plurality of second signal transmission lines SL2 configured to transmit pixel signals between the first chip 50-1 and the second chip 50-2.

According to some example embodiment, a frame memory 145, a first DBS block 135-1, and a second DBS block 135-2 may be included in the first chip 50-1, and an active pixel block 110, a first CDS block 133-1, and a second CDS block 133-2 may be included in the second chip 50-2.

Signals output from the first CDS block 133-1 may be transmitted to the first DBS block 135-1 via the plurality of first signal transmission lines SL1. Signals output from the second CDS block 133-2 may be transmitted to the second DBS block 135-2 via the plurality of second signal transmission lines SL2.

Referring to FIGS. 1 and 2D, the image sensor 100-4 is some embodiment of the image sensor 100 of FIG. 1.

In the image sensor 100-4 according to some example embodiment, a first CDS block 133-1, a first DBS block 135-1, a frame memory 145, a second DBS block 135-2, and a second CDS block 133-2 may be included in a first chip 50-1, and only an active pixel block 110 may be included in a second chip 50-2.

Signals output from the active pixel block 110 may be transmitted to the first CDS block 133-1 via a plurality of first signal transmission lines SL1. Signals output from the active pixel block 110 may be transmitted to the second CDS block 133-2 via a plurality of second signal transmission lines SL2.

In the case of the image sensors 100-3 and 100-4 illustrated in FIGS. 2C and 2D, pixel signals corresponding to pixels included in a first region of the active pixel block 110 may be output to the first CDS block 133-1 and pixel signals corresponding to pixels included in a second region of the active pixel block 110 except for the first region may be output to the second CDS block 133-2, under control of the row driver 120.

Figure 3A:
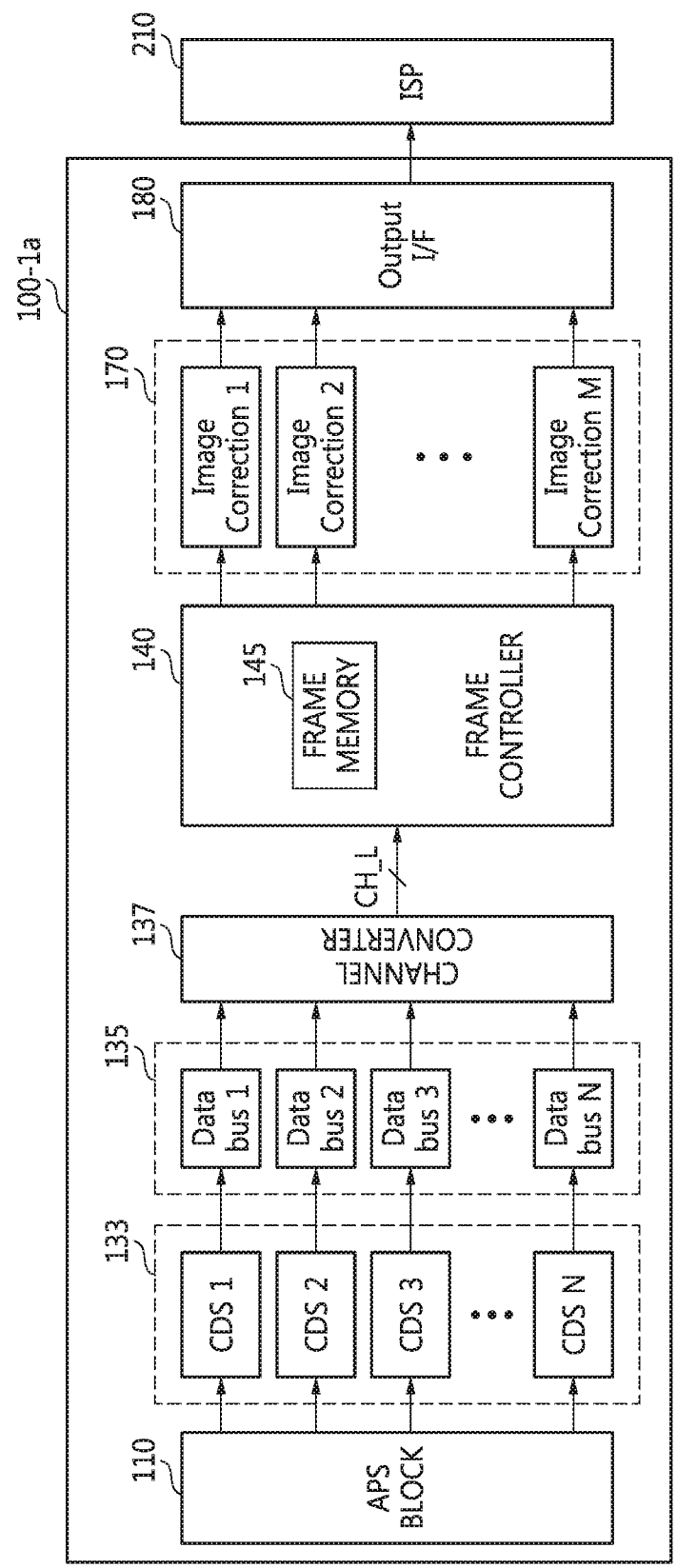
FIG. 3A is a block diagram of an image sensor of FIG. 1 according to some embodiments of the inventive concept.
Figure 3B:
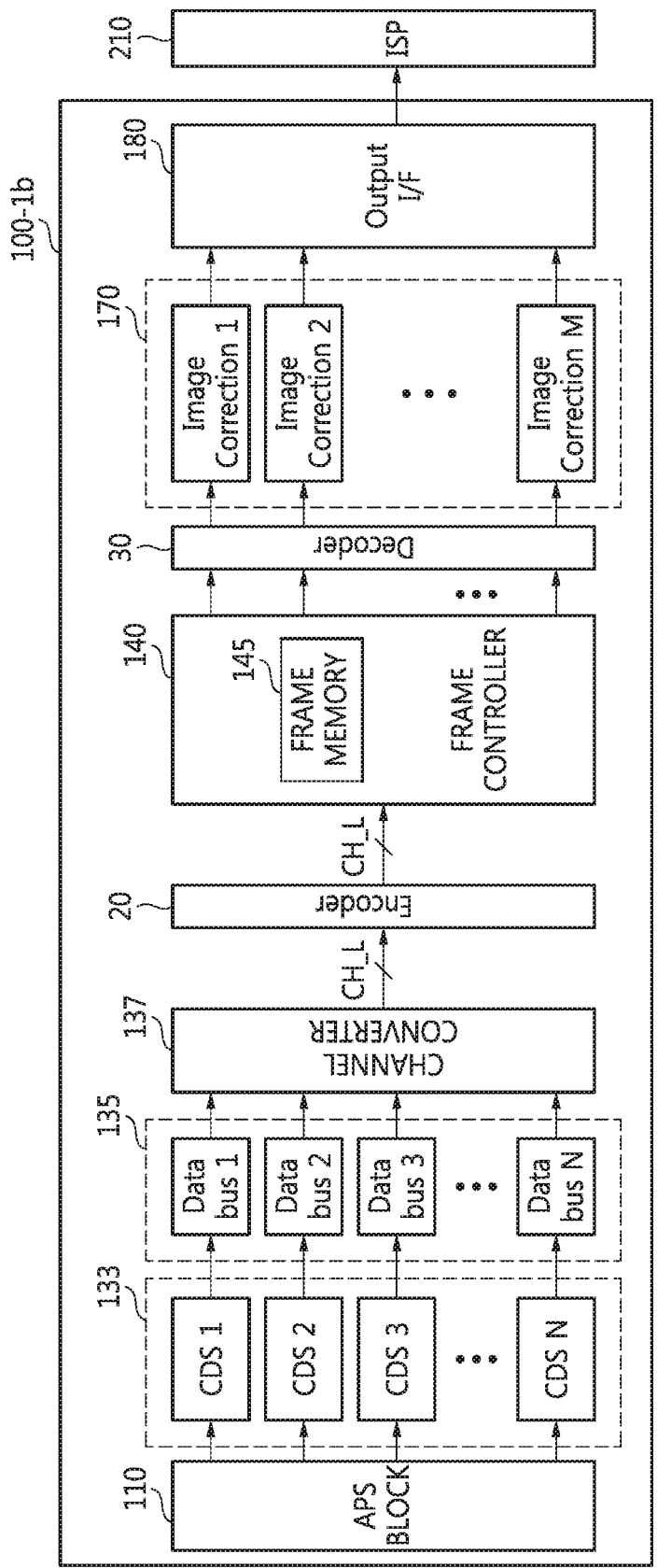
FIG. 3B is a block diagram of an image sensor of FIG. 1 according to some embodiments of the inventive concept.

FIG. 3A is a block diagram of an image sensor 100-1a of FIG. 1 according to some embodiments of the inventive concept. FIG. 3B is a block diagram of an image sensor 100-1b, such as that shown in FIG. 1, according to some embodiments of the inventive concept. In FIGS. 3A and 3B, only some components of the image sensor 100 illustrated in FIG. 1 will be described as examples.

Referring to FIGS. 1 and 3A, a CDS block 133 may include a plurality of CDS circuits CDS 1 to CDS N, and a DBS block 135 may include a plurality of DBS circuits Databus 1 to Databus N. That is, the CDS block 133 may include the plurality of CDS circuits CDS 1 to CDS N corresponding to a plurality of column lines, and the DBS block 135 may include the plurality of DBS circuits Databus 1 to Databus N corresponding to the plurality of column lines.

Among the plurality of CDS circuits CDS 1 to CDS N and the plurality of DBS circuits Databus 1 to Databus N, one CDS circuit and one DBS circuit may be each implemented as an analog-to-digital converter. Thus, the plurality of CDS circuits and the plurality of DBS circuits may form the ADC block 130.

An image correction block 170 may include a plurality of image correction circuits Image Correction 1 to Image Correction M.

Pixel signals according to a predetermined pixel unit may be output in parallel from one or more row lines of an active pixel block 110 to the CDS block 133, based on a line control signal LCS output from a timing generator 150.

In this case, the pixel signals according to the predetermined pixel units may be the values of pixels corresponding to one or more row lines. The pixel signals may be output in parallel to the CDS block 133 via N channels corresponding to a plurality of column lines of the active pixel block 110. Here, 'N' denotes an integer which is greater than or equal to '4'.

The CDS block 133 may perform CDS on the pixel signals. The DBS block 135 may convert the pixel signals on which CDS is performed into digital pixel signals, and output the digital pixel signals.

The channel converter 137 may convert the N channels corresponding to the plurality of column lines into channels corresponding to input ports of a frame controller 140.

The channel converter 137 may output digital pixel signals, which are received in units of predetermined pixels via the N channels, to the frame controller 140 via L channels CH_L. The N channels may be grouped into the L channels. Here, 'L' denotes an integer that is less than 'N'. The channel converter 137 may include a plurality of multiplexers (not shown) but embodiments of the inventive concept are not limited thereto.

The frame controller 140 may sequentially store, in a frame memory 145, the digital pixel signals output from the channel converter 137 via the L channels CH_L. The frame controller 140 may sequentially output the digital pixel signals stored in the frame memory 145 via M channels. Here, "M" denotes an integer that is less than or equal to 'L'.

That is, the frame controller 140 may store the pixel signals in units of L pixels, and output the pixel signals in units of M pixels.

In this case, the frame controller 140 may further include a compressing device (not shown) configured to compress the digital pixel signals output from the channel converter 137 and output the compressed digital pixel signals to the frame memory 145, and an uncompressing device (not shown) configured to uncompress and output the compressed digital pixel signals stored in the frame memory 145.

The image correction block 170 may correct image data corresponding to the digital pixel signals output in parallel from the frame controller 140, and output the corrected image data.

To this end, as illustrated in FIG. 3A, the image correction block 170 may include M circuits.

That is, an output interface 180 may output pixel signals (which are output from the active pixel block 110 via the N channels) in units of L pixels to an image signal processor (ISP) 210 via the M channels.

According to some example embodiments, the image sensor 100-1a may further include an encoder and a decoder. An example of an image sensor 100-1b including an encoder and a decoder is illustrated in FIG. 3B.

Referring to FIG. 3B, an encoder 20 may encode digital pixel signals output from a channel converter 137 and output the encoded data, which are obtained by encoding the digital pixel signals, to a frame controller 140.

The frame controller 140 may sequentially store the encoded data in a frame memory 145, and sequentially output the stored encoded data.

A decoder 30 may decode the encoded data output from the frame controller 140, and output decoded data to an image correction block 170.

FIG. 4 is a timing diagram illustrating operations of an image sensor according to a comparative example of the inventive concept. FIG. 5 is a timing diagram illustrating operations of an image sensor according to some embodiments of the inventive concept.

Referring to FIG. 4, lines Line 1 to Line n represent outputting of pixel signals read out from the active pixel block 110 to the ISP 210 via the output interface 180.

As the image sensor operates according to a rolling shutter method, the pixel signals corresponding to the lines Line 1 to Line n are sequentially read out at different points of time t1 through tn, and are analog-to-digital converted and output during a predetermined time period Tcout.

That is, a rolling shutter effect may occur due to time differences between the points of time t1 through tn, thereby causing an output image to distort.

Figure 5:
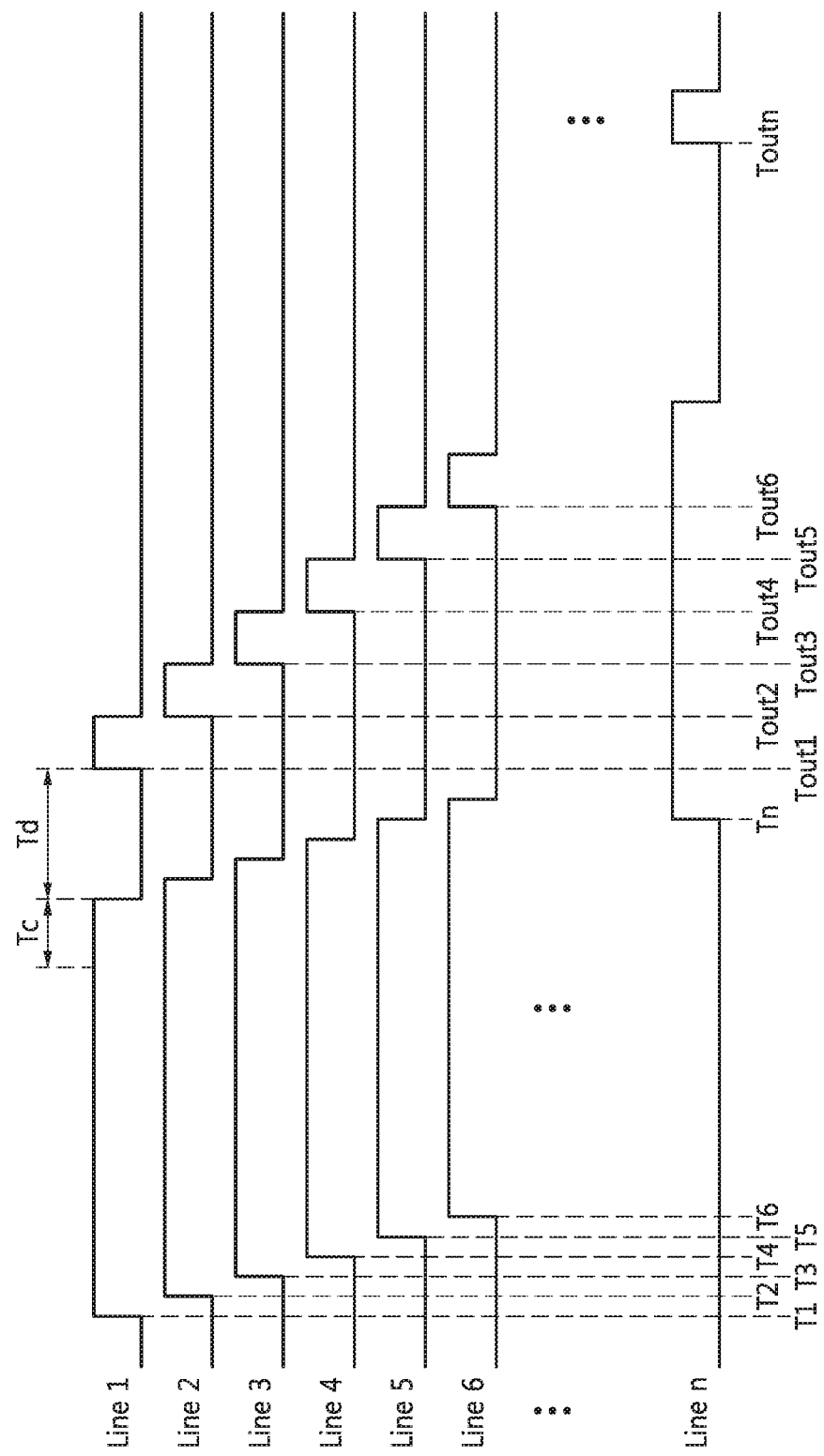
FIG. 5 is a timing diagram illustrating operations of an image sensor according to some embodiments of the inventive concept.

In contrast, referring to FIGS. 3A and 5, each of lines Line 1 to Line n represents outputting of pixel signals according to predetermined pixels corresponding to one or more row lines from the active pixel block 110 through the output interface 180.

For example, the first line Line 1 represents that pixel signals corresponding to photocharges accumulated in photo diodes included in the active pixel block 110 may be generated and read out before a first time period Tc, starting from a first point of time T1.

During the first time period Tc, the CDS block 133 and the DBS block 135 may perform an analog-to-digital conversion on the pixel signals to obtain digital pixel signals, and the digital pixel signals may be output to the frame controller 140.

After a second time period Td, at a second point of time Tout1, the frame controller 140 may output the digital pixel signal and the image correction block 170 may correct image data corresponding to the digital pixel signal and output the corrected image data.

In this case, the second time period Td is a time period between when the digital pixel signals are stored in the frame memory 145 and when the digital pixel signals are output to the image correction block 170, and may vary according to a ratio between a speed of reading out data by the active pixel block 110 and a speed of outputting the data by the output interface 180. That is, because the number of input ports of the frame controller 140 and the number of output ports thereof are different from each other, the second time period Td may vary according to the number of channels corresponding to the input ports of the frame controller 140 and the number of channels corresponding to the output ports thereof. The above operation may be repeatedly performed with respect to the second line Line 2 to the $n^{th}$ line Line n.

For this operation, the timing generator 150 may output the line control signal LCS to the row driver 120 so that the pixel signals may be read out from the active pixel block 110 at first intervals between the points of time T1 through Tn.

During the first time period Tc, the ADC block 130 may perform analog-to-digital conversion on read-out pixel signals and output digital pixel signals. The frame controller 140 may receive the digital pixel signals and sequentially store them in the frame memory 145.

After the second time period Td, the frame controller 140 may sequentially output the digital pixel signals to the image correction block 170 at second intervals between the points of time Tout1 through Toutn.

In this case, the first intervals between the points of time T1 through Tn may be shorter than the second intervals between the points of time Tout1 through Toutn.

The read-out pixel signals corresponding to the lines Line 1 to Line n may be converted by the ADC block 130 and transmitted in parallel to the frame memory 145. The digital pixel signals stored in the frame memory 145 may be sequentially output to the output interface 180 separately from the converting and transmitting of the read-out pixel signals. Therefore, the second time period Td corresponding to each line Line 1 to Line n, may have a different time period.

That is, because the intervals between the points of time T1 through Tn in the embodiment of FIG. 5 are shorter than the intervals between the points of time t1 through tn in the comparative example of FIG. 4, pixel signals may be read out at a high speed regardless of outputting of the pixel signals to the output interface 180, thereby reducing or minimizing distortion of an output image.

Thus, a frame rate of the pixel signals before they are stored in the frame memory 145 may be higher than that of the pixel signals after they are output from the frame memory 145.

Figure 6:
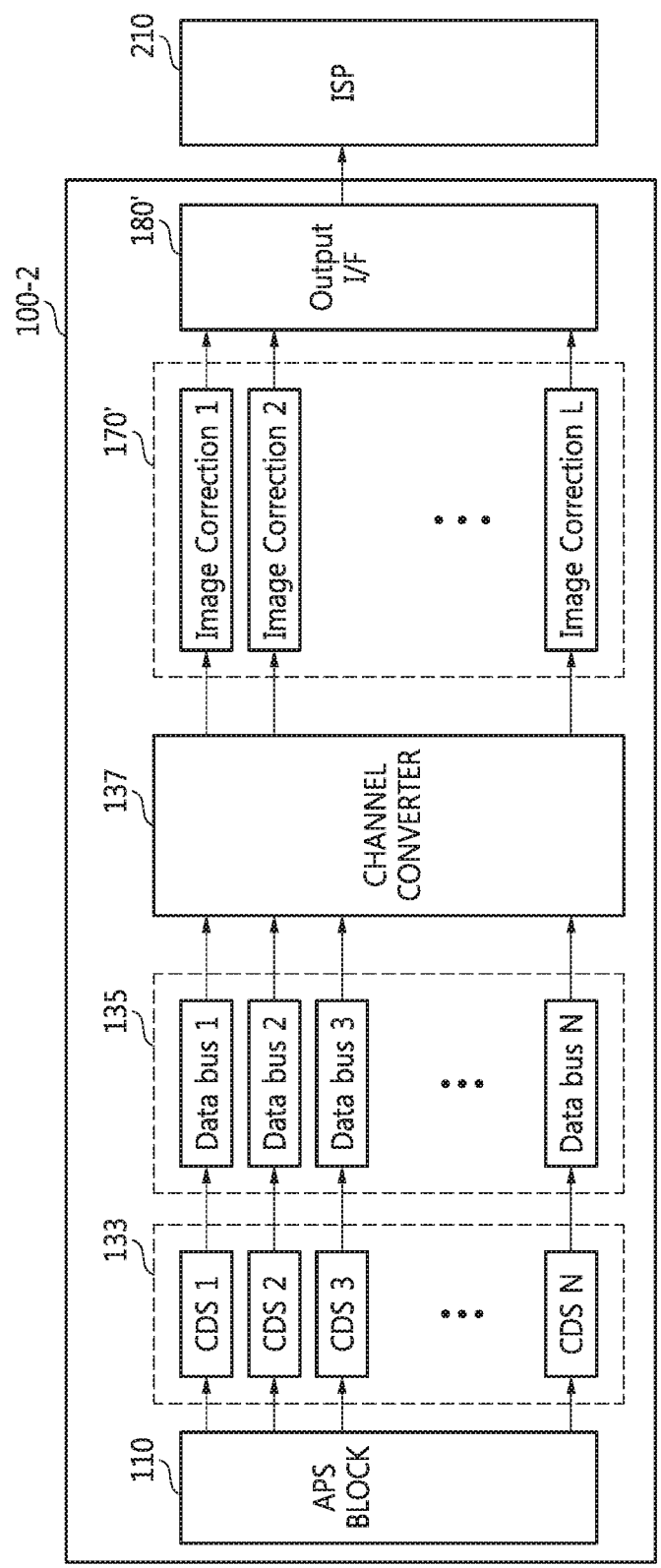
FIG. 6 is a block diagram of an image sensor of FIG. 1 according to some embodiments of the inventive concept.

FIG. 6 is a block diagram of an image sensor 100-2 of FIG. 1 according to some embodiments of the inventive concept. In FIG. 6, some components of the image sensor 100-2 that are substantially the same as those of the image sensor illustrated in FIG. 1 will be described as examples.

Referring to FIGS. 1 and 6, the image sensor 100-2 according to some example embodiments may not include the frame controller 140 and the frame memory 145, as compared to the image sensor 100-1a of FIG. 3A.

Pixel signals according to a predetermined pixel unit may be output in parallel to CDS block 133 via N channels corresponding to a plurality of column lines from one or more row lines of an active pixel block 110, based on a line control signal LCS output from a timing generator 150. Here, 'N' denotes an integer that is greater than or equal to '4'.

The CDS block 133 may perform CDS on the pixel signals, and a DBS block 135 may convert signals on which CDS is performed into digital pixel signals and output the digital pixel signals.

A channel converter 137 may output the digital pixel signals, which are received in units of predetermined pixels via the N channels, to an image correction block 170' via L channels. Here, 'L' denotes an integer that is less than 'N'.

The image correction block 170' may correct image data corresponding to the digital pixel signals output in parallel from the channel converter 137 via the L channels, and output the corrected image data.

An output interface 180' outputs pixel signals (which are output from the active pixel block 110 via N channels) in units of L pixels to an ISP 210 via L channels.

Accordingly, the image processing system 10 may include the image sensor 100-1a or 100-1b of FIG. 3A or 3B when the ISP 210 includes M channels, and may include the image sensor 100-2 of FIG. 6 when the ISP 210 includes L channels. Here, 'M' denotes an integer that is less than or equal to 'L'.

Figure 7:
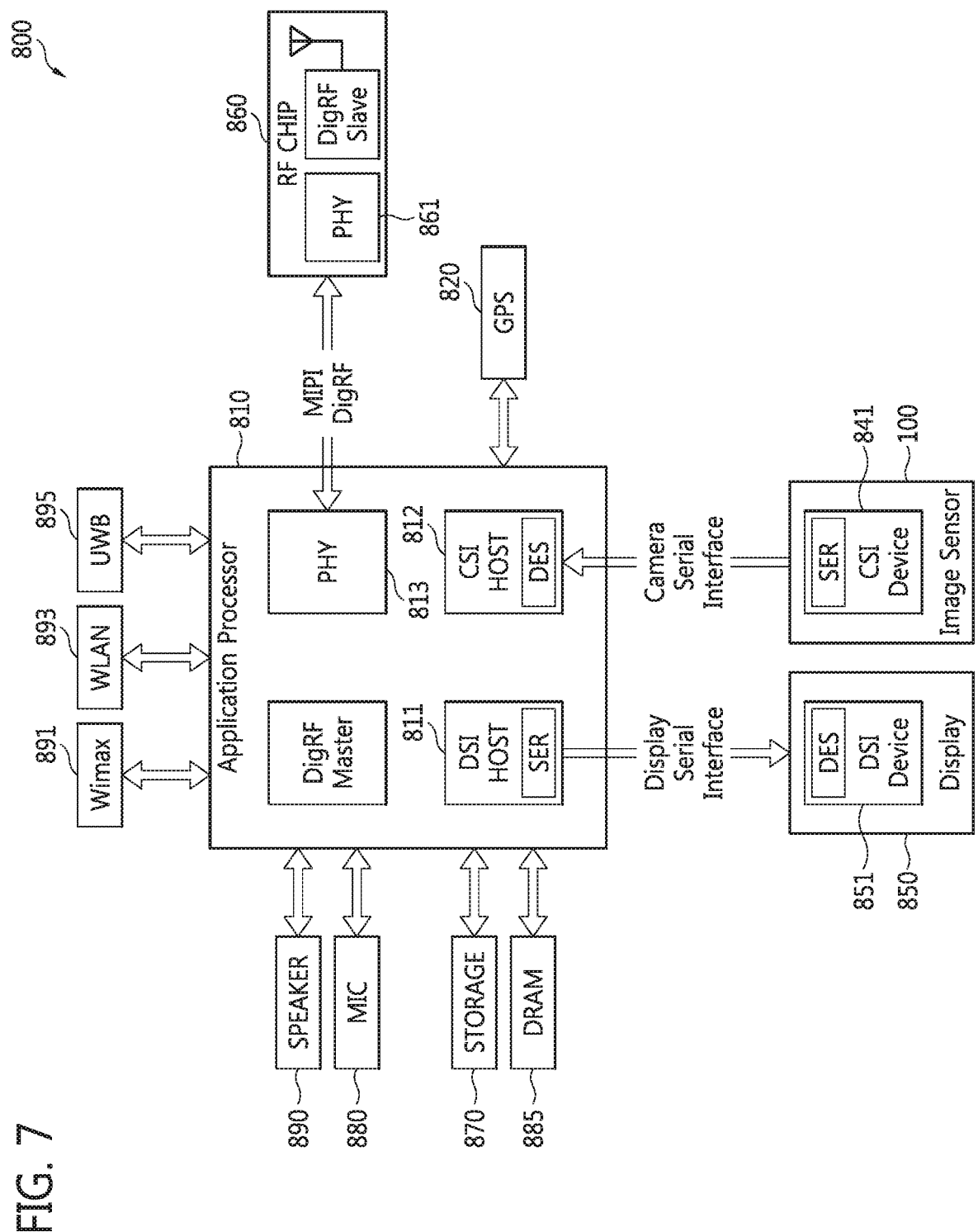
FIG. 7 is a block diagram of an electronic system including the image sensor of FIG. 1 according to some embodiments of the inventive concept.

FIG. 7 is a block diagram of an electronic system 800 with the image sensor 100 of FIG. 1 according to some embodiments of the inventive concept.

Referring to FIGS. 1 and 7, the electronic system 800 may be a data processing apparatus capable of using or supporting a mobile industry processor interface (MIPI), e.g., a mobile phone, a personal digital assistant (PDA), a portable multimedia player (PMP), an internet protocol television (IPTV), or a smart phone.

The electronic system 800 includes an image sensor 100, an application processor 810, and a display 850.

A camera serial interface (CSI) host 812 included in the application processor 810 may establish serial communication with a CSI device 841 of an image sensor 100 via a camera serial interface. In this case, for example, the CSI host 812 may include an optical deserializer DES and the CSI device 841 may include an optical serializer SER.

A display serial interface (DSI) host 811 included in the application processor 810 may establish serial communication with a DSI device 851 of the display 850 via a DSI. In this case, for example, the DSI host 811 may include an optical serializer SER and the DSI device 851 may include an optical deserializer DES.

In one example embodiment, the electronic system 800 may further include a radio-frequency (RF) chip 860 for communicating with the application processor 810. Data may be exchanged between a PHYsical (PHY) channel 813 included in the application processor 810 and a PHY channel 861 included in the RF chip 860 according to MIPI DigRF.

In one example embodiment, the electronic system 800 may further include a global positioning system (GPS) 820, a storage unit 870, a microphone MIC 880, a dynamic random access memory (DRAM) 885, and a speaker 890. The electronic system 800 may establish communication via world interoperability for microwave access (Wimax) 891, a wireless local area network (WLAN) 893 and/or an ultra wideband (UWB) 895.

Figure 8:
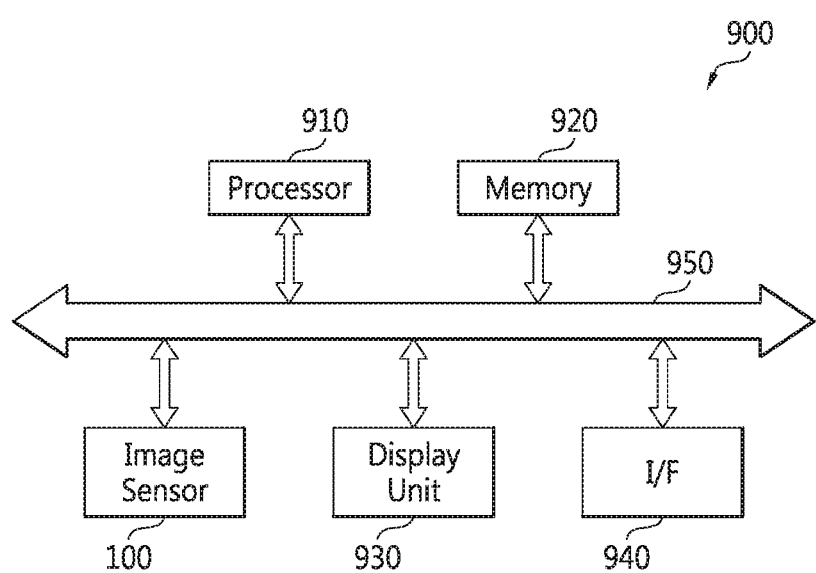
FIG. 8 is a block diagram of an electronic system including the image sensor of FIG. 1 according to some embodiments of the inventive concept.

FIG. 8 is a block diagram of an electronic system 900 with the image sensor 100 of FIG. 1 according to some embodiment of the inventive concept.

Referring to FIGS. 1 and 8, the electronic system 900 may include an image sensor 100, a processor 910, a memory 920, a display unit 930, and an interface 940.

The processor 910 may control an operation of the image sensor 100. For example, the processor 910 may generate image data by processing a pixel signal output from the image sensor 100.

The memory 920 may store a program for controlling operations of the image sensor 100, and image data generated by the processor 910. The processor 910 may execute the program stored in the memory 920. For example, the memory 920 may be a volatile memory or a nonvolatile memory.

The display unit 930 may display the image data output from the processor 910 or the memory 920. For example, the display unit 930 may be a liquid crystal display (LCD), an LED display, an OLED display, an active-matrix organic light-emitting diodes (AMOLED) display, or a flexible display.

The interface 940 may be embodied as an interface configured to input or output image data. In one example embodiment, the interface 940 may be a wireless interface.

An image sensor and an image processing system including the image sensor according to example embodiments of the inventive concept are capable of reading out a pixel signal at a high speed, thereby reducing a rolling shutter effect.

Also, an image sensor and an image processing system including the image sensor according to example embodiments of the inventive concept are capable of performing frame rate conversion to reduce the rolling shutter effect, thereby decreasing power consumption.

While the inventive concept has been particularly shown and described with reference to example embodiments thereof, it will be understood that various changes in form and details may be made therein without departing from the spirit and scope of the following claims.

What is claimed is:

1. An image sensor comprising:
    a pixel array comprising a plurality of pixels configured to output pixel signals corresponding to a plurality of row lines;
    a row driver configured to output a plurality of control signals for controlling operations of the plurality of pixels;
    a plurality of analog-to-digital converters configured to perform analog-to-digital conversion, wherein each of the plurality of analog-to-digital converters includes a correlated double sampling (CDS) block configured to perform CDS on the pixel signals output from the plurality of pixels via a plurality of column lines and a databus (DBS) block configured to respectively convert the pixel signals on which CDS is performed into digitalized pixel signals, and to output the digitalized pixel signals;
    a timing generator configured to generate a line control signal, the pixel array being configured to output the pixel signals corresponding to the plurality of row lines responsive to the line control signal; and
    a frame controller configured to store, in a frame memory, the digitalized pixel signals output in parallel from the DBS block, and sequentially output the stored digitalized pixel signals,
    wherein the pixel signals are output in a predetermined pixel unit in parallel from at least one row line among the plurality of row lines responsive to the row driver receiving the line control signal, and
    wherein a time delay between the digitalized pixel signals being stored in the frame memory and the stored digitalized pixels signals being sequentially output is based on a ratio of a speed of outputting the pixel signals from the pixel array and a speed of sequentially outputting the stored digital pixel signals or the time delay between the digitalized pixel signals being stored in the frame memory and the stored digitalized pixels signals being sequentially output is based on a number of input ports of the frame controller and a number of output ports of the frame controller.

2. The image sensor of claim 1, further comprising:
    a channel converter configured to convert a number of channels corresponding to the plurality of column lines into channels corresponding to input ports of the frame controller,
    wherein the channel converter is configured to convert N channels corresponding to the plurality of column lines into L channels corresponding to the input ports of the frame controller, wherein N denotes an integer that is greater than or equal to 4 and L denotes an integer that is less than N, and
    wherein the frame memory comprises a static random access memory (SRAM), and the frame controller is configured to manage a storage region of the frame memory.

3. The image sensor of claim 2, wherein the frame controller is configured to receive the digitalized pixel signals output via the L channels, to store the digitalized pixel signals in the frame memory, and to output the stored digitalized pixel signals via M channels, wherein M denotes an integer that is less than or equal to L.

4. The image sensor of claim 3, further comprising an image correction block configured to correct image data corresponding to the digitalized pixel signals output from the frame controller to generate corrected image data, and to output the corrected image data, and
    wherein the plurality of analog-to-digital converters comprise N analog-to-digital converters, and
    wherein the image correction block comprises M image correction circuits.

5. The image sensor of claim 2, wherein the timing generator is configured to control the plurality of row lines to output the pixel signals from the pixel array during a first time interval, and wherein the frame controller is configured to output the digitalized pixel signals from the frame memory during a second time interval, and wherein the first time interval is shorter than the second time interval.

6. The image sensor of claim 2, wherein the frame controller comprises:
a compressing device configured to compress the digitalized pixel signals output from the DBS block to generate compressed digitalized pixel signals and to output the compressed digitalized pixel signals to the frame memory; and
an uncompressing device configured to uncompress the compressed digitalized pixel signals stored in the frame memory to generate uncompressed digitalized pixel signals and to output the uncompressed digitalized pixel signals.

7. The image sensor of claim 2, further comprising:
an encoder configured to encode the digitalized pixel signals output from the DBS block to generate encoded data and to output the encoded data to the frame controller; and
a decoder configured to decode the encoded data received from the frame controller to generate decoded data, and to output the decoded data.

8. The image sensor of claim 1, further comprising:
a first chip comprising the frame memory; and
a second chip stacked on the first chip, the second chip comprising the pixel array and the plurality of analog-to-digital converters.

9. The image sensor of claim 1, wherein the pixel array is further configured to output the pixel signals corresponding to the plurality of row lines responsive to the line control signal so as to have a first time interval between respective start times for outputting consecutive ones of the plurality of row lines,
wherein the frame controller is further configured to output the digitalized pixel signals so as to have a second time interval between respective start times for outputting the digitalized pixels signals corresponding to the consecutive ones of the plurality of row lines, and
wherein the first time interval is shorter than the second time interval.

10. An image processing system comprising:
an image sensor; and
a digital signal processor coupled to the image sensor, the image sensor being responsive to control by the digital signal processor,
wherein the image sensor comprises:
a pixel array comprising a plurality of pixels configured to output pixel signals corresponding to a plurality of row lines;
a row driver configured to output a plurality of control signals for controlling operations of the plurality of pixels;
a plurality of analog-to-digital converters configured to perform analog-to-digital conversion, wherein each of the plurality of analog-to-digital converters includes a correlated double sampling (CDS) block configured to perform CDS on the pixel signals output from the plurality of pixels via a plurality of column lines and a databus (DBS) block configured to respectively convert the pixel signals on which CDS is performed into digitalized pixel signals, and to output the digitalized pixel signals;
a timing generator configured to generate a line control signal, the pixel array being configured to output the pixel signals corresponding to the plurality of row lines responsive to the line control signal;
a frame memory configured to store the digitalized pixel signals; and
a frame controller configured to store, in a frame memory, the digitalized pixel signals output in parallel from the DBS block, and sequentially output the stored digitalized pixel signals,
wherein the pixel signals are output in a predetermined pixel unit in parallel from at least one row line among the plurality of row lines responsive to the row driver receiving the line control signal, and
wherein a time delay between the digitalized pixel signals being stored in the frame memory and the stored digitalized pixels signals being sequentially output is based on a ratio of a speed of outputting the pixel signals from the pixel array and a speed of sequentially outputting the stored digital pixel signals or the time delay between the digitalized pixel signals being stored in the frame memory and the stored digitalized pixels signals being sequentially output is based on a number of input ports of the frame controller and a number of output ports of the frame controller.

11. The image processing system of claim 10,
wherein the image sensor further comprises a channel converter configured to convert N channels corresponding to the plurality of column lines into L channels, wherein N denotes an integer that is greater than or equal to 4 and L denotes an integer that is less than N.

12. The image processing system of claim 11, wherein the frame controller is further configured to sequentially store, in the frame memory, the digitalized pixel signals output in parallel from the DBS block via the L channels, and sequentially output the digitalized pixel signals stored in the frame memory via M channels, wherein M is an integer that is less than or equal to L.

13. The image processing system of claim 12, wherein the timing generator is configured to control the plurality of row lines to output the pixel signals from the pixel array during a first time interval, and
wherein the frame controller is configured to output the digitalized pixel signals from the frame memory during a second time interval,
wherein the first time interval is shorter than the second time interval.

14. The image processing system of claim 12, wherein the frame controller comprises:
a compressing device configured to compress the digitalized pixel signals output from the DBS block to generate compressed digitalized pixel signals and to output the compressed digitalized pixel signals to the frame memory; and
an uncompressing device configured to uncompress the compressed digitalized pixel signals stored in the frame memory to generate uncompressed digitalized pixel signals and to output the uncompressed digitalized pixel signals.

15. The image processing system of claim 10, further comprising:
a first chip comprising the frame memory; and
a second chip stacked on the first chip, the second chip comprising the pixel array and the plurality of analog-to-digital converters.

16. The image processing system of claim 10, wherein the pixel array is further configured to output the pixel signals corresponding to the plurality of row lines responsive to the line control signal so as to have a first time interval between respective start times for outputting consecutive ones of the plurality of row lines,
wherein the frame controller is further configured to output the digitalized pixel signals so as to have a second time interval between respective start times for outputting the digitalized pixels signals corresponding to the consecutive ones of the plurality of row lines, and
wherein the first time interval is shorter than the second time interval.

17. An image sensor, comprising:
a pixel array configured to generate a plurality of pixel signals on a plurality of column lines, respectively;
a plurality of analog-to-digital signal converter circuits configured to generate a plurality of digitalized pixel signals responsive to the plurality of pixel signals received on the plurality of column lines, respectively, wherein each of the plurality of analog-to-digital converter circuits includes a correlated double sampling (CDS) circuit and a databus circuit, the CDS circuit being configured to perform correlated double sampling on a respective one of the plurality of pixel signals to generate a CDS output signal and the databus circuit being configured to generate a respective one of the digitalized pixel signals responsive to the CDS output signal;
a channel converter that is configured to multiplex the plurality of digitalized pixel signals onto a plurality of frame controller input channels; and
a frame controller that is configured to store in a frame memory the plurality of digitalized pixels signals received on the plurality of frame controller input channels and to output the plurality of digitalized pixel signals onto a plurality of frame controller output channels,
wherein the plurality of pixel signals are generated on the plurality of column lines, respectively during a first time interval and the plurality of digitalized pixel signals are output onto the plurality of frame controller output channels during a second time interval, the first time interval being shorter than the second time interval, and
wherein a time delay between the plurality of digitalized pixel signals being stored in the frame memory and the plurality of digitalized pixels signals being output is based on a ratio of a speed of outputting the plurality of pixel signals from the pixel array and a speed of outputting the plurality of digitalized pixel signals or the time delay between the plurality of digitalized pixel signals being stored in the frame memory and the plurality of digitalized pixels signals being output is based on a number of the frame controller input channels and a number of the frame controller output channels.

18. The image sensor of claim 17, wherein a number of the plurality of column lines is N, a number of the plurality of frame controller input channels is L, and a number of the plurality of frame controller output channels is M; and
wherein N is greater than L and L is greater than or equal to M.

19. The image sensor of claim 17, further comprising:
an encoder that is configured to encode the plurality of digitalized pixel signals that are multiplexed onto the plurality of frame controller input channels; and
a decoder that is configured to decode the plurality of digitalized pixel signals that are output onto the plurality of frame controller output channels.

20. The image sensor of claim 19, further comprising:
a plurality of image correction circuits that are configured to generate a plurality of image corrected signals responsive to the plurality of digitalized pixel signals output onto the plurality of frame controller output channels, respectively.

* * * * *